United States Patent
Hung et al.

(10) Patent No.: US 9,513,683 B2
(45) Date of Patent: Dec. 6, 2016

(54) CONTROL CIRCUITRY USED IN A COMPUTING SYSTEM, AND POWER SUPPLY HAVING THE CONTROL CIRCUITRY

(75) Inventors: Chin-Hsing Hung, Nantou County (TW); Ming-Chao Hung, Changhua County (TW)

(73) Assignees: UNIVERSAL SCIENTIFIC INDUSTRIAL (SHANGHAI) CO., LTD., Shanghai (CN); UNIVERSAL GLOBAL SCIENTIFIC INDUSTRIAL CO., LTD., Nan-Tou (TW)

( * ) Notice: Subject to any disclaimer, the term of this patent is extended or adjusted under 35 U.S.C. 154(b) by 146 days.

(21) Appl. No.: 14/364,768

(22) PCT Filed: Dec. 14, 2011

(86) PCT No.: PCT/CN2011/084015
§ 371 (c)(1),
(2), (4) Date: Jun. 12, 2014

(87) PCT Pub. No.: WO2013/086713
PCT Pub. Date: Jun. 20, 2013

(65) Prior Publication Data
US 2015/0067370 A1     Mar. 5, 2015

(51) Int. Cl.
*H02J 9/04* (2006.01)
*G06F 1/32* (2006.01)
(Continued)

(52) U.S. Cl.
CPC .............. *G06F 1/3203* (2013.01); *G06F 1/266* (2013.01); *H02J 9/005* (2013.01); *H02M 3/33561* (2013.01)

(58) Field of Classification Search
CPC ................................ H02J 9/005; G06F 1/266
See application file for complete search history.

(56) References Cited

U.S. PATENT DOCUMENTS

2009/0063877 A1    3/2009  Lewis et al.
2011/0095607 A1*   4/2011  Humphrey .............. H02J 9/005
                                                         307/31

(Continued)

FOREIGN PATENT DOCUMENTS

CN          1254117 A       5/2000
CN          1402105 A       3/2003

(Continued)

OTHER PUBLICATIONS

China Patent Office, International Search Report for PCT Application No. PCT/CN2011/084015.

(Continued)

*Primary Examiner* — Albert Wang
(74) *Attorney, Agent, or Firm* — Li & Cai Intellectual Property (USA) Office

(57) ABSTRACT

The present disclosure provides a control circuitry used in a computing system, for enabling or disabling a standby module of a power supply. The control circuitry is electrically coupled to two nodes of the standby module, and comprises a determination circuit, a transistor, and an optical coupler. The present disclosure further provides a power saving method used in a computing system is illustrated. Whether the computing system is turned off is determined. If the computing system is turned off, a setting that whether the turned off computing system requires the standby voltage is judged. If the turned off computing system does not require the standby voltage, a standby module of a power supply is disabled.

15 Claims, 10 Drawing Sheets

(51) Int. Cl.
*G06F 1/26* (2006.01)
*H02J 9/00* (2006.01)
*H02M 3/335* (2006.01)

(56) References Cited

U.S. PATENT DOCUMENTS

| | | | |
|---|---|---|---|
| 2011/0099389 A1* | 4/2011 | Matula | G06F 1/266 713/300 |
| 2011/0103103 A1* | 5/2011 | Zhan | H02M 3/33507 363/21.15 |
| 2011/0197084 A1 | 8/2011 | Xi | |
| 2011/0271131 A1* | 11/2011 | Lefebvre | G06F 1/26 713/323 |
| 2012/0047381 A1* | 2/2012 | Zhou | G06F 1/26 713/323 |

FOREIGN PATENT DOCUMENTS

| | | |
|---|---|---|
| CN | 1786876 A | 6/2006 |
| CN | 101887301 A | 11/2010 |
| CN | 102147652 A | 8/2011 |
| GB | 2343823 A | 5/2000 |
| TW | I236587 B | 7/2005 |
| TW | 201019095 A | 5/2010 |
| TW | 201042411 A | 12/2010 |

OTHER PUBLICATIONS

Taiwan Patent Office, Office action issued on Apr. 28, 2014.

* cited by examiner

| system state | SLP_LAN_N | SB5V | Condition |
|---|---|---|---|
| turned off | high | high | wiht AMT or WOL |
| turned off | low | low | wihtout AMT or WOL |

CONTROL CIRCUITRY USED IN A COMPUTING SYSTEM, AND POWER SUPPLY HAVING THE CONTROL CIRCUITRY

TECHNICAL FIELD

The present disclosure relates to a power supply of a computing system, in particular, to a power saving method and a control circuitry related to a power supply.

BACKGROUND OF THE INVENTION

The information technology manufacture now provides a mother board with a wake-up function, such as Wake-up On LAN technology (WOL) or advanced management technology (AMT). A power of the mother board with the wake-up function is provided by a power supply having a system module and a standby module, and the power supply for example is an Advanced Technology eXtended (ATX) power supply. When the user turns off the computing system, the system module of the power supply is turned off without providing the system voltage to the mother board, but the standby module of the power supply is still turned on, such that the standby module is able to provide a standby voltage to the mother board for waiting to receive a wake-up signal. Once the mother board receives the wake-up signal, the computing system will be turned on soon.

Referring to FIG. 1, FIG. 1 is a block diagram of a conventional power supply. The conventional power supply 1 is used in a computing system for providing a power to the mother board. The conventional power supply 1 includes an AC rectification block 11, a system module 12, and a standby module 13. The AC (alternative current) rectification block 11 receives an AC (alternative current) power from an AC (alternative current) power supply source 2 electrically coupled thereto, and thus outputs a DC power to the system module 12 and the standby module 13. The AC rectification block 11 is further used to adjust the power factor of the DC power.

The system module 12 outputs a plurality of voltages such as +12V, +5V, and +3.3V. The system module 12 is substantially a DC/DC converter or a switched power supply module, which includes a system switch block 121, an isolation transformer 122, a system output block 123, and a system feedback block 124.

The DC power is inputted to the isolation transformer 122 and the system switch block 121. The primary winding of the isolation transformer 122 is electrically coupled to the AC rectification block 31 and the system switch block 121 respectively. The system feedback block 124 is electrically coupled between the system switch block 121 and the system voltage (+5V). The system output block 123 electrically coupled to the two ends of the secondary winding of the isolation transformer 122, and outputs the system voltages (+12V, +5V, and +3.3V) to the mother board.

The composition and function of standby module 13 is similar to system module 12 expect the output voltage. The outputted voltage of the standby module 13 is single for providing standby voltage, such as +5V (SB5V), to the wake-up module of the mother board.

It is noted that the system module 12 is turned on when the computing system is turned on, but is turned off when the computing system is turned off. The standby module 13 is turned on even when the computing system is turned off, such that the computing system is able to be wake-up when a wake-up signal is used to trigger the wake-up module of the mother board. Even when the computing system or the mother board is not used to support the wake-up function, the standby module 13 still provides the standby voltage, and thus the unnecessary power consumption is increased.

Currently, more and more people take care of the environmental protection issue, and most countries are dedicated to reduce the unnecessary power consumption. To save the power, the user must pull the plug of the power supply or switch the on/off bottom of the conventional power supply to turn off the standby module, and thus it is inconvenient to the user.

SUMMARY OF THE INVENTION

An exemplary embodiment of the present disclosure provides a control circuitry used in a computing system, for enabling or disabling a standby module of a power supply. The control circuitry is electrically coupled to two nodes of the standby module, and comprises a determination circuit, a transistor, and an optical coupler. The determination circuit judges a setting that whether the turned off computing system requires a standby voltage. The transistor has a control end electrically coupled to the determination circuit. When the determination circuit judges the setting that the turned off computing system requires a standby voltage correspondingly, the transistor is turned off, otherwise, the transistor is turned on. The optical coupler is electrically coupled to the transistor. When the transistor is turned on, the optical coupler shorts the two nodes of the standby module to enable the standby module, and when the transistor is turned off, the optical coupler disconnects the two nodes of the standby module to disable the standby module.

An exemplary embodiment of the present disclosure provides a power supply comprising an AC rectification block, a system module, and a standby module. The system module is coupled to the AC rectification block. The standby module is coupled to the AC rectification block. The standby module has a control circuitry. The control circuitry judges a setting that whether the turned off computing system requires a standby voltage correspondingly to enable or disable the standby module.

An exemplary embodiment of the present disclosure provides a power saving method used in a computing system. Whether the computing system is turned off is determined. If the computing system is turned off, a setting that whether the turned off computing system requires the standby voltage is judged. If the turned off computing system does not require the standby voltage, a standby module of a power supply is disabled.

To sum up, the power saving method and the control circuitry disclosed in the exemplary embodiment of the present disclosure therefore meet the environmental protection tends, and bring the convenience to the user.

In order to further understand the techniques, means and effects the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification.

The drawings illustrate exemplary embodiments of the present disclosure and, together with the description, serve to explain the principles of the present disclosure.

FIG. 4 is a table showing the relation among the system state, the standby voltage, the signal SLP_LAN_N, and the condition whether the computing system supports the wake-up function according to an exemplary embodiment of the present disclosure.

DETAILED DESCRIPTION OF THE PREFERRED EMBODIMENTS

Figure 1:
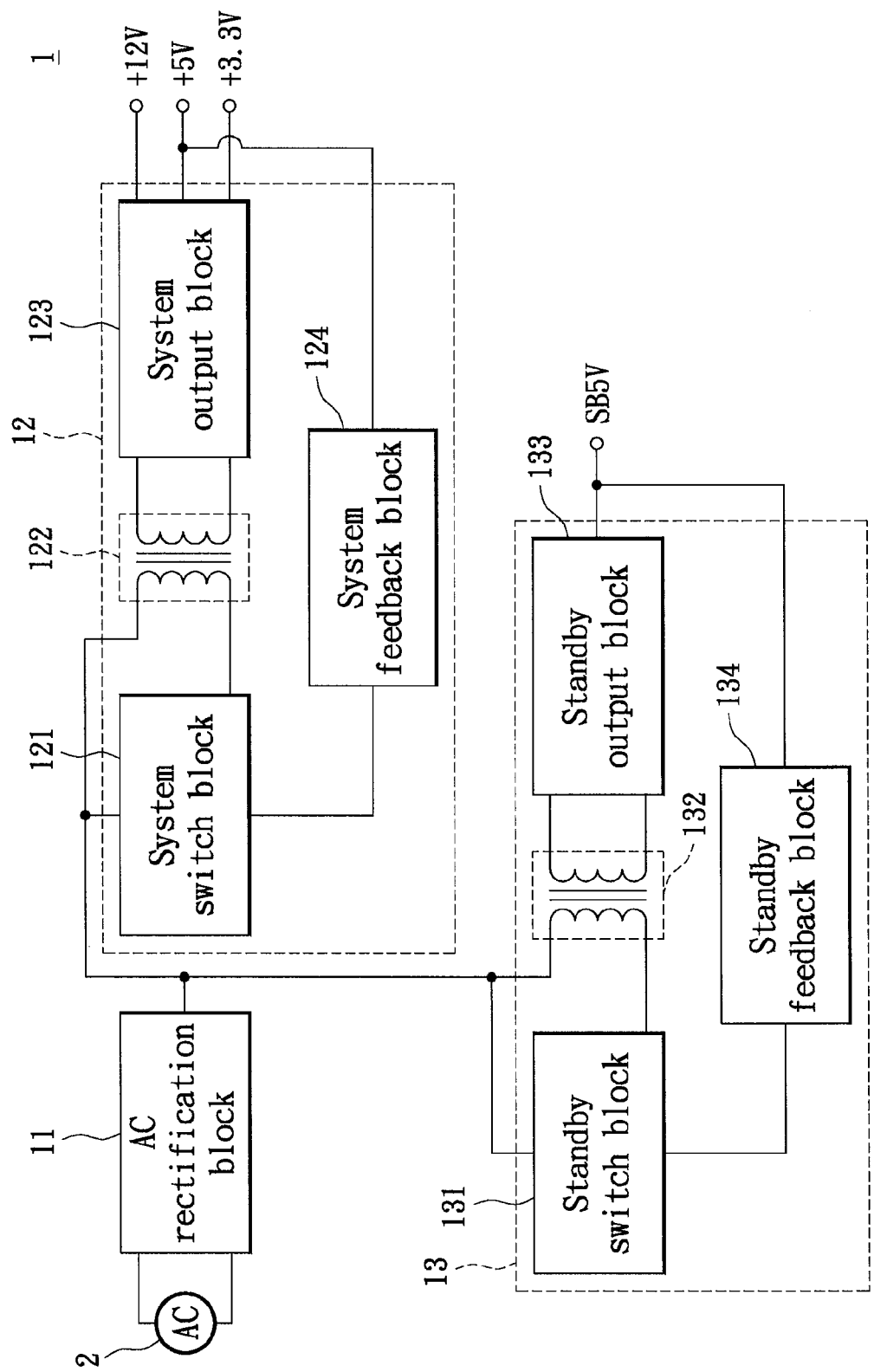
FIG. 1 is a block diagram of a conventional power supply.

Reference will now be made in detail to the exemplary embodiments of the present disclosure, examples of which are illustrated in the accompanying drawings. Wherever possible, the same reference numbers are used in the drawings and the description to refer to the same or like parts.

Figure 2A:
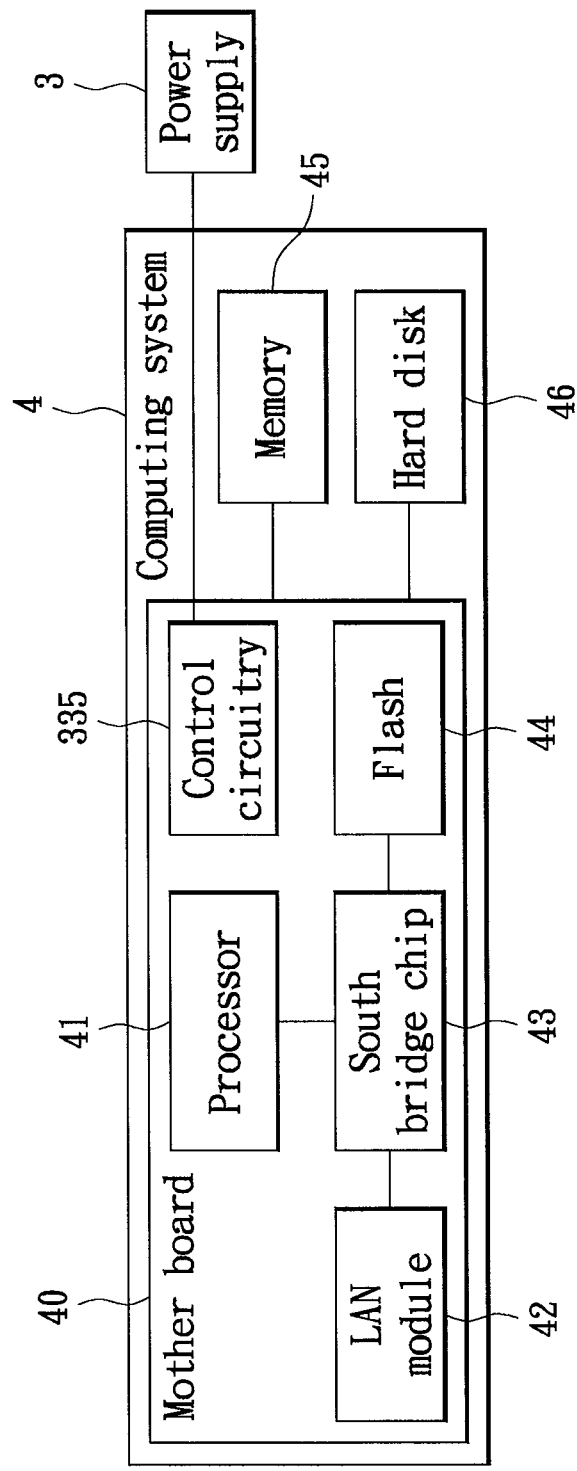
FIG. 2A is a block diagram of a computing system according to an exemplary embodiment of the present disclosure.

Referring to FIG. 2A, FIG. 2A is a block diagram of a computing system according to an exemplary embodiment of the present disclosure. The computing system 4 comprises a mother board 40, a memory 45, and a hard disk 46. The memory 45 and the hard disk 46 are electrically coupled to the mother board 40. The mother board 40 comprises a processor 41, a local area network (LAN) module 42, a south bridge chip 43, a flash 44, and a control circuitry 335. The south bridge chip 43 is electrically coupled to the processor 41, the LAN module 42, and the flash 44. The control circuitry 335 is electrically coupled to the power supply 3.

The control circuitry 335 controls the power supply 3 whether to output the standby voltage to computing system 4. That is, the standby module of the power supply can be turned off by the control of the control circuitry 335 when the computing system 4 does not require the standby voltage, such that the power consumption is saved.

Figure 2B:
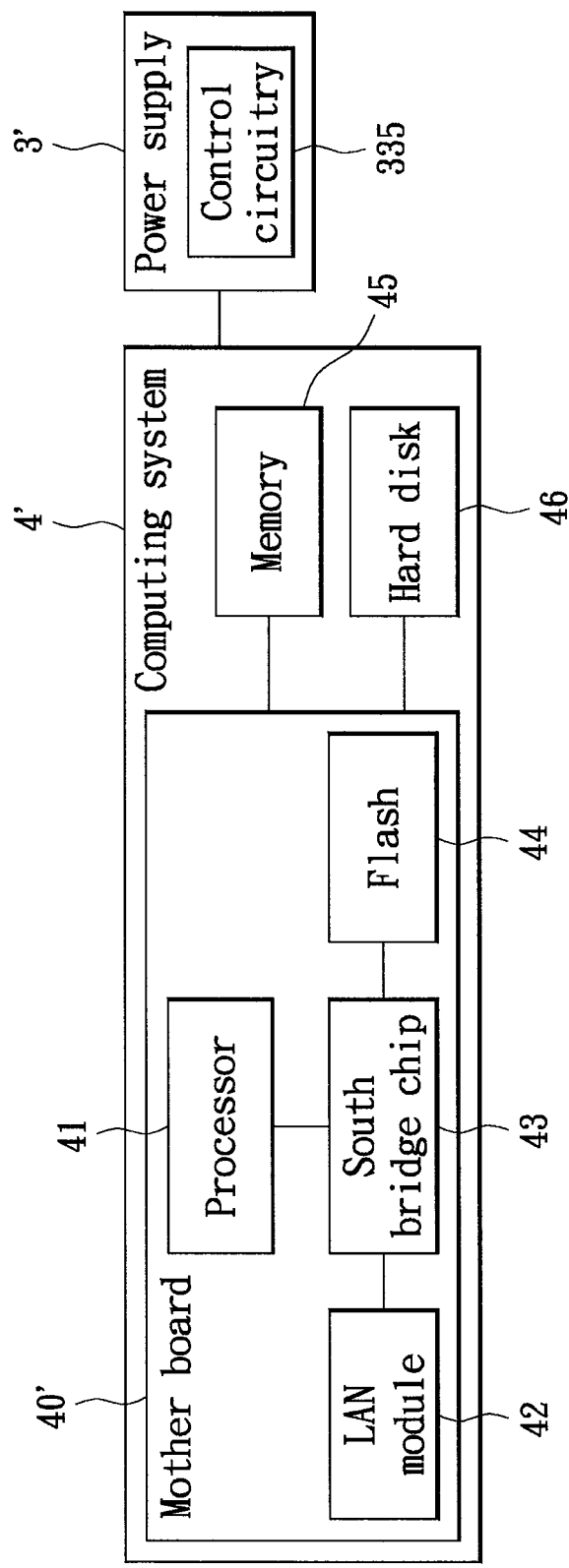
FIG. 2B is a block diagram of a computing system according to another exemplary embodiment of the present disclosure.

The control circuitry 335 is integrated in the mother board 40 in the exemplary embodiment of FIG. 2A, but the present disclosure is not limited thereto. Referring to FIG. 2B, FIG. 2B is a block diagram of a computing system according to an exemplary embodiment of the present disclosure. In this embodiment, the control circuitry 335 is integrated in the power supply 3' instead of integrating in the mother board 40 of the exemplary embodiment of FIG. 2A. In some consideration such as for guarantee the requirement of the electromagnetic compatibility (EMC) or to prevent the damage of the component of the mother board from high volts output of AC rectification block, it is preferred to integrate the control circuitry 335 in the power supply 3' as FIG. 2B demonstrated.

Figure 3:
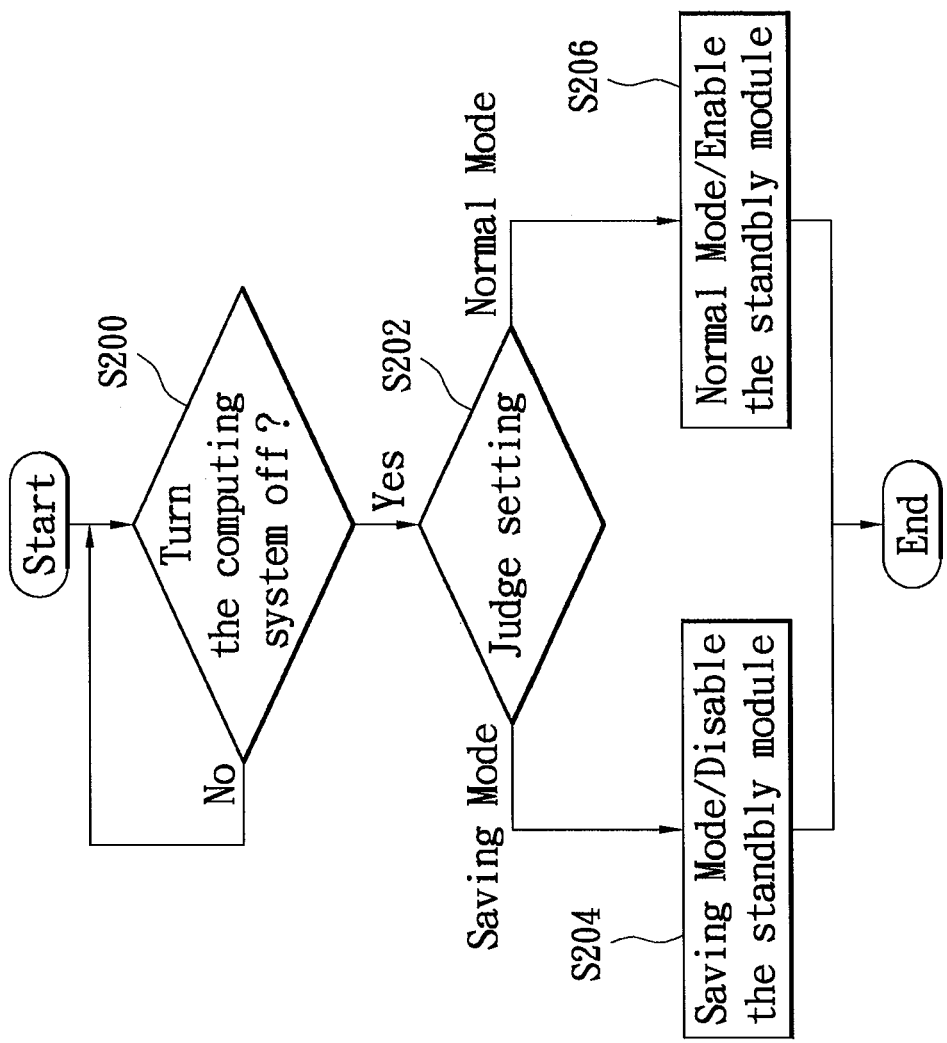
FIG. 3 is a flow chart that shows a process for setting mode according to an exemplary embodiment of the present disclosure.

Referring to FIG. 3, FIG. 3 is a flow chart of a power saving method according to an exemplary embodiment of the present disclosure. The power saving method is used in control circuitry for controlling power supply whether to output the standby voltage to a computing system. The control circuitry receives a least one of specific signals, such as the signal SLP_LAN_N (or the signals SLP_LAN_N and SLP_S5) from the mother board to determine whether the standby module should be turned off or turned on when the computing system is turned off. The control circuitry may be implemented by a firmware, hardware, software or the combination thereof.

In step S200, whether the computing system is tuned off is determined by the control circuitry in the power supply. The control circuitry detects the voltage level of at least one of the system state signals that is presented of the system state of the computing system, so as to determine whether the computing system is turned off according to the at least one of the received system state signals. For example, the system state signal can be the signal SLP_S5 or SLP_S4, and the control circuitry detects the voltage level of the signal SLP_S5 or SLP_S4 to determine whether the computing system is turned off. In practice, after the user pushes the power switch or orders a turned off command through the operating system, the system state signal SLP_S5 would be the low level. If the computing system is not turned off, step 200 will be executed again. If the computing system is turned off, step S202 will be executed.

In step S202, a setting of the computing system is judged. The control circuitry judges the setting according to a judging table or at least one of standby voltage demand signals, wherein the standby voltage demand signal is presented of the requirement of the standby voltage in the computing system. The standby voltage demand signal can be the wake-up function supportable signal, for example, the signal SLP_LAN_N. The setting can be simply judged according to the voltage level of the signal SLP_LAN_N, or the setting can be judged according to both of the voltage levels of the signals SLP_LAN_N and SLP_S5.

If the control circuitry judges the setting that computing system should enter the saving mode, step S204 will be executed. If the computing system judges the setting that the computing system should not enter the saving mode, i.e., the computing system should enter a normal mode, step S206 will be executed.

In step S204, the control circuitry disables the standby module of the power supply, such that the computing system enters the saving mode, and the power supply does not provide the standby voltage (SB5V) to the mother board. In step S206, the control circuitry enables the standby module of the power supply, such that the computing system enters the normal mode, and thus the standby voltage (SB5V) is provided to the mother board.

Referring to FIG. 4, FIG. 4 is a table showing the relation among the system state, the standby voltage, the signal SLP_LAN_N, and the condition whether the computing system supports the wake-up function according to an exemplary embodiment of the present disclosure. In this exemplary embodiment, when the system state of the computing system is turned off, whether the standby module is disable or enable is judged according to the signal SLP_LAN_N. If the condition is that the mother board or the computing system is not able to support the wake-up function, the signal SLP_LAN_N would be the low level, and thus the setting that the computing system should enter the saving mode is judged. Conversely, if the condition is that the mother board and the computing system are able to support the wake-up function, the signal SLP_LAN_N would be the high level, and thus the setting that the computing system should enter the normal mode is judged.

It is noted that the foregoing example is not used to limit the present disclosure. The user mutually specify the condition whether the computing system should not enter a saving mode by configuring BIOS (Basic Input and Output System) or adjusting jumpers on the mother board.

The aforementioned method is very convenient to the user without pulling the plug of the power supply or switching the on/off bottom of the power supply to turn off the whole power supply, such that the standby module is disabled, and the unnecessary power consumption is saved.

When the computing system in the saving mode, the user can push the power switch of the computing system to restart the computing system, and thus the battery (such as VCC battery) can be used to activate the control circuitry to enable the standby module of the power supply. Then, the voltage levels of the standby voltage (SB5V), and the signals SLP_S5, SLP_LAN_N would change to be the high level.

Figure 5A:
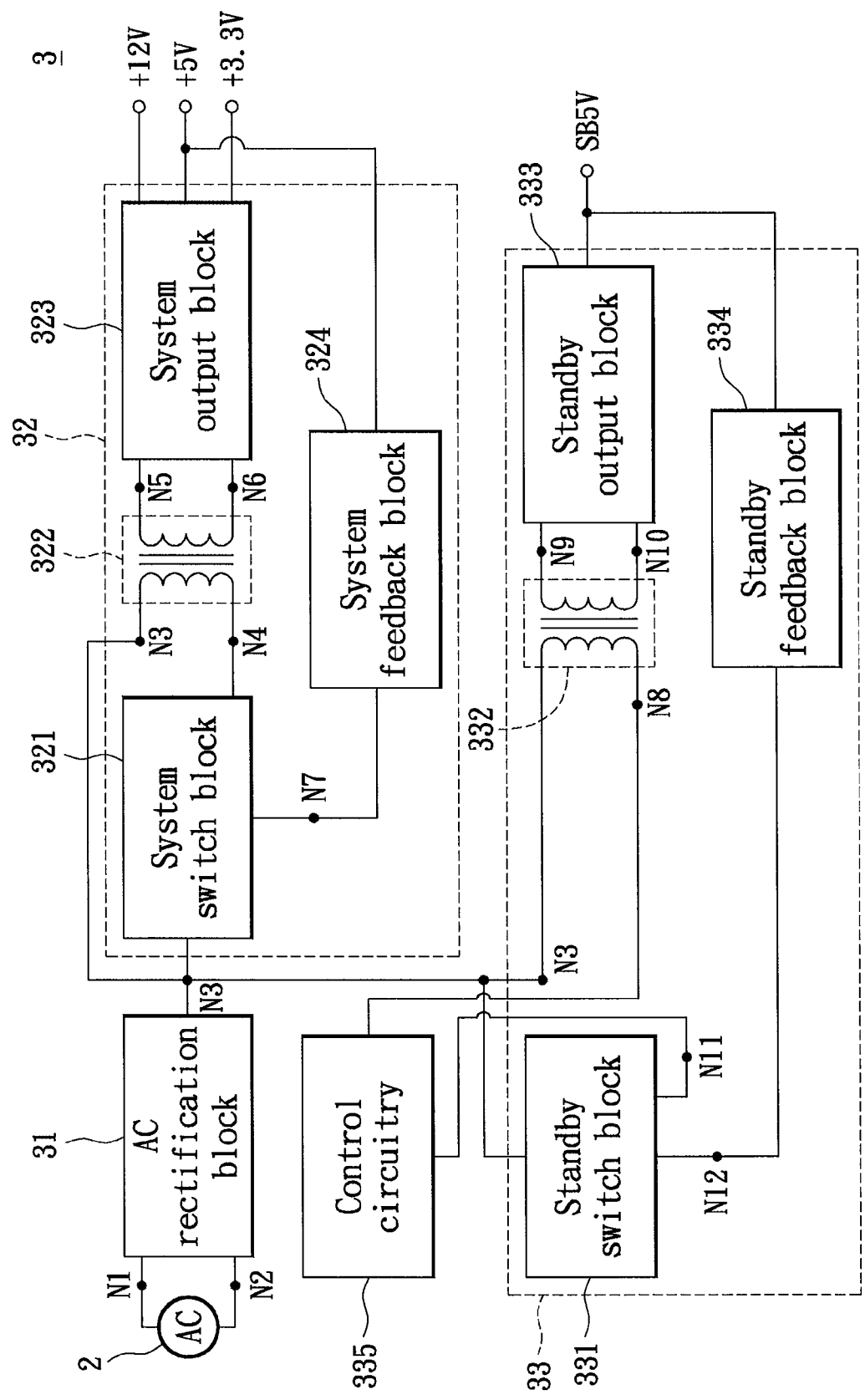
FIG. 5A is a block diagram of a power supply according to an exemplary embodiment of the present disclosure.

Referring to FIG. 5A, FIG. 5A is a block diagram of a power supply according to an exemplary embodiment of the present disclosure. The power supply 3 is used to provide different voltages to the mother board. The power supply 3 includes an AC rectification block 31, a system module 32, and a standby module 33. The control circuitry 335 in the mother board is electrically coupled to the standby module 33. The AC power supply source 2 is electrically coupled to the AC rectification block 31 through nodes N1 and N2 respectively. The AC rectification block 31 outputs a DC power to the system module 32 and the standby module 33 through node N3. The AC rectification block 31 further adjusts the power factor of the DC power.

The system module 32 outputs a plurality of voltages for computing system such as +12V, +5V, and +3.3V. The system module 32 is substantially a DC/DC converter or a switched power supply module, which includes a system switch block 321, an isolation transformer 322, a system output block 323, and a system feedback block 324.

The DC power is inputted to the isolation transformer 322, the system switch block 321, and the standby module 33 through node N3. The primary winding of the isolation transformer 322 is electrically coupled to the output of AC rectification block 31 and the system switch block 321 through nodes N3 and N4 respectively. The system feedback block 324 is electrically coupled between system switch block 321 through node N7 and one of the system voltage outputs such as +5V. The system output block 323 is electrically coupled to the secondary winding of the isolation transformer 322 through nodes N5 and N6, and outputs the multiple system voltages, such as +12V, +5V, and +3.3V, to the mother board.

The control circuitry 335 in the mother board is electrically coupled to the standby module 33, and used to judge the setting whether the standby module 33 should be disabled or enabled. The standby module 33 outputs a standby voltage (SB5V) when the computing system operates in the normal mode, otherwise it is disable to output the standby voltage (SB5V) when the computing system enters the saving mode. The standby module 33 is substantially a DC/DC converter or a switched power supply module, which includes a standby switch block 331, an isolation transformer 332, a standby output block 333, and a standby feedback block 334.

The control circuitry 335 in the mother board is electrically coupled to the standby module 33 respectively through the nodes N8, N11. The DC power is inputted to the isolation transformer 332 and the standby switch block 331 through node N3. The primary winding of the isolation transformer 332 is electrically coupled to the AC rectification block 31 and the control circuitry 335 respectively through nodes N3 and N8. The standby feedback block 334 is electrically coupled between the standby switch block 331 through node N12 and the output of standby module 33. The standby output block 333 is electrically coupled to the secondary winding of the isolation transformer 332 through nodes N9 and N10, and the output of standby module 33 which connected to the mother board.

The control circuitry 335 can be a hardware based implementation for enabling or disabling the standby module 33, and the control circuitry 335 receives at least one of the system state signals and standby voltage demand signals, such as SLP_S5 and SLP_LAN_N signals from the mother board. Once the computing system enters the saving mode, the control circuitry 335 disconnects the nodes N8 and N11, and thus the standby module 33 is disabled to output the standby voltage (SB5V). Otherwise, the control circuitry 335 shorts the nodes N8 and N11, and thus the computing system keeps operating in the normal mode and outputting the standby voltage (SB5V).

Figure 5B:
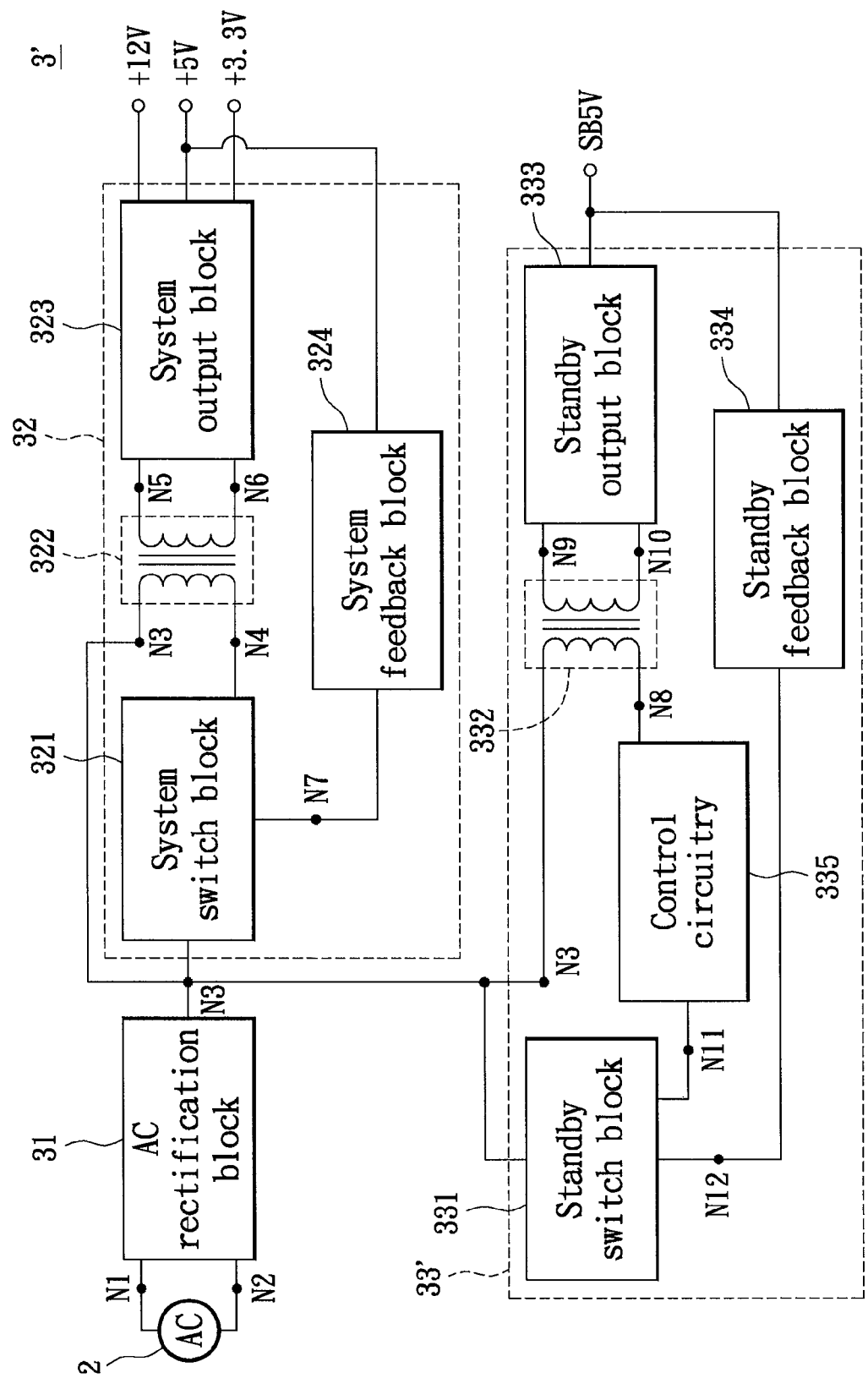
FIG. 5B is a block diagram of a power supply according to another exemplary embodiment of the present disclosure.

As mentioned above, the control circuitry 335 may be implemented in the power supply 3' as shown in FIG. 5B. FIG. 5B is a block diagram of a power supply according to another exemplary embodiment of the present disclosure. In this embodiment, the standby module 33' includes the control circuitry 335, and the power supply 3' electrically coupled to the mother board to receive the signals SLP_S5 and SLP_LAN_N.

Figure 6:
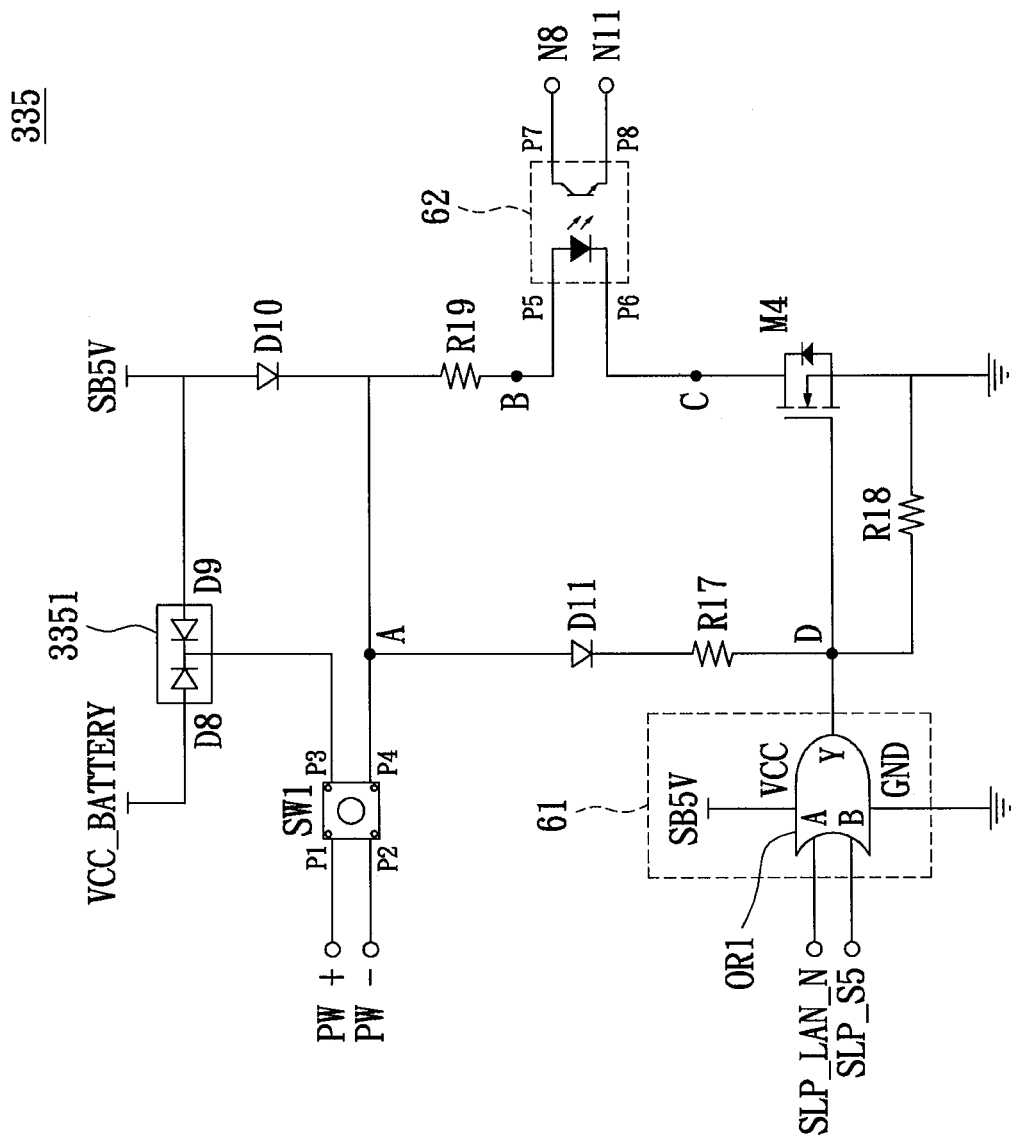
FIG. 6 is a block diagram of a control circuitry according to an exemplary embodiment of the present disclosure.

Referring to FIG. 6, FIG. 6 is a block diagram of a control circuitry according to an exemplary embodiment of the present disclosure. The control circuitry 335 is a hardware implementation, but the present disclosure is not limited thereto. In the exemplary embodiment, the control circuitry 335 receives two signals SLP_LAN_N and SLP_S5 from the mother board to judge the setting. It is noted that, in the other exemplary embodiment, the control circuitry may receive at least one of system state signals and standby voltage demand signals, wherein the standby voltage demand signal can be the wake-up function supportable signal.

The control circuitry 335 includes a flow controller 3351, a power switch SW1, resistors R17, R18, R19, a transistor M4, diodes D10, D11, an optical coupler 62, and a determination circuit 61. The flow controller 3351 is electrically coupled to the battery voltage (VCC_BATTERY), the standby voltage (SB5V), and a pin P3 of the power switch SW1. Pins P1 and P2 of the power switch SW1 are electrically coupled to the power ends (PW+, PW−) of the AC power supply source 2 respectively. One end of diode D10 is electrically coupled to SB5V and the other end is electrically coupled to the resistor R19, a pin P4 of the power switch SW1 and one end of diode D11. The other end of diode D11 is electrically coupled to the resistor R17. The resistor R18 is electrically coupled to the ground and the resistor R17. A first end of the transistor M4 is electrically coupled to a pin P6 of the optical coupler 62, a second end of the transistor M4 is electrically coupled to the ground, and a control end of the transistor M4 is electrically coupled to the determination circuit 61, resistors R17 and R18. A pin P5 of the optical coupler 62 is electrically coupled to the resistor R19. Pins P7 and P8 of the optical coupler 62 are electrically coupled to nodes N8 and N11 respectively. The determination circuit 61 is electrically coupled to the mother board to receive the signals SLP_LAN_N and SLP_S5.

In the exemplary embodiment, the determination circuit 61 is implemented by a logic-OR operation gate OR1 for receiving the signals SLP_LAN_N and SLP_S5. In other practices, the determination circuit 61 may be any combination of logic gates, and the determination circuit 61 may receive at least one of signals system state signals and standby voltage demand signals, wherein the standby voltage demand signal can be the wake-up function supportable signal.

Figure 7A:
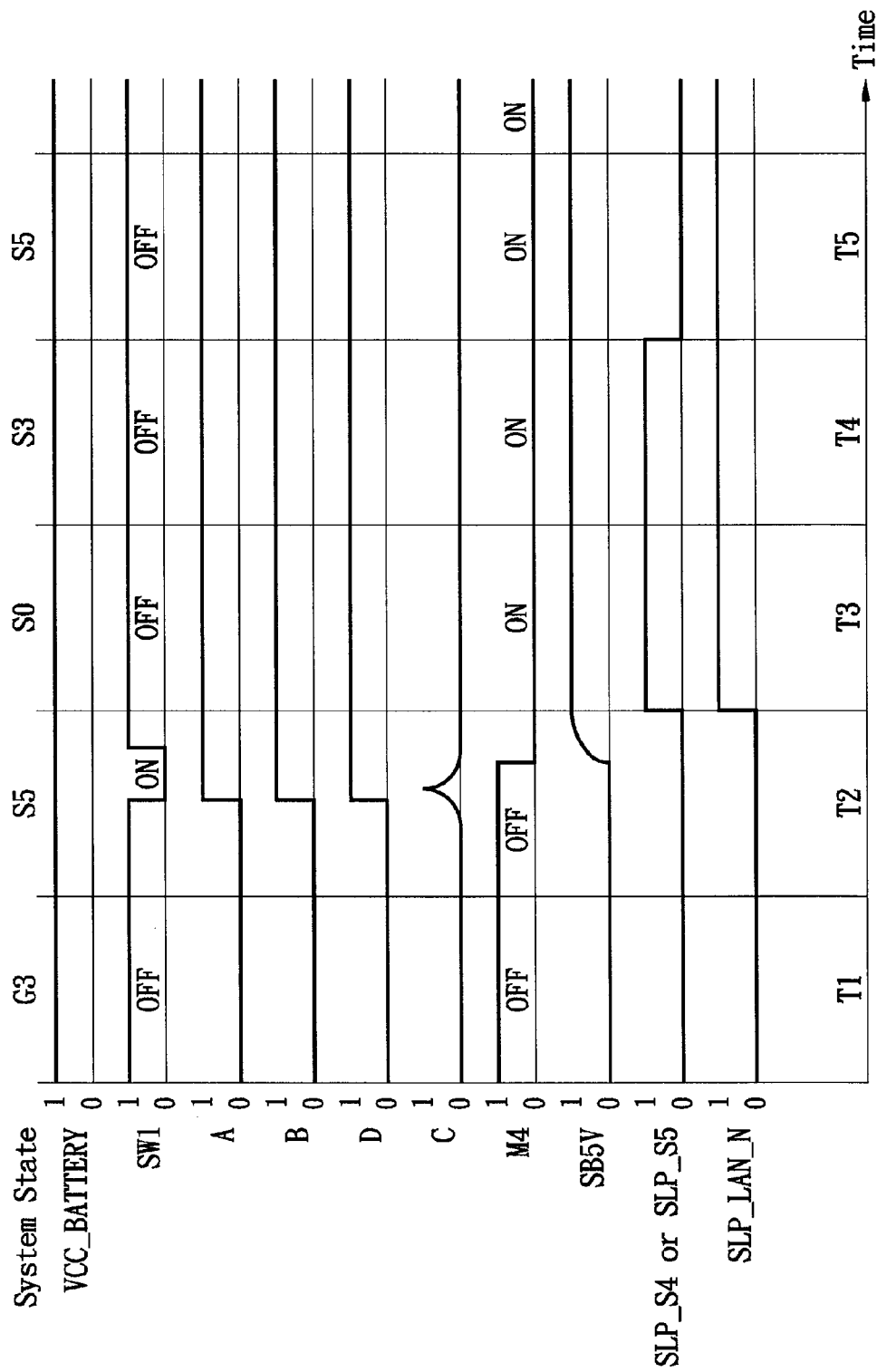
FIG. 7A is a wave diagram of the signals in the control circuitry when computing system supports the wake-up function according to an exemplary embodiment of the present disclosure.

Referring to FIG. 7A, FIG. 7A is a wave diagram of the signals in the control circuitry when computing system supports the wake-up function according to an exemplary embodiment of the present disclosure. At time T1, the computing system supporting WOL technology and AMT is turned off (i.e. the system state is for example G3).

During the time T2, when the user pushes the power switch SW1 to turn on the computing system to support WOL technology and AMT (i.e. the system state is for example the S5 state), the pins P1 and P2 are shorted, and the pins P3 and P4 are shorted. A current is flowing from the battery VCC_BATTERY to the ground through the diode D8, the pins P3, P4, the diode D11 and the resistor R17, R18, and the transistor M4 is turned on. Since the transistor M4 is turned on, the pins P5 and P6 are shored, and pins P7 and P8 are shorted. Thus, the standby module is enabled to provide the standby voltage SB5V to the mother board. The diode D9 of the flow controller 3351 is then turned on, and the diode D8 of the flow controller 3351 is turned off. Thus, a current is flowing from the standby voltage SB5V to the ground through the diode D9, the pins P3, P4, the diode D11 and the resistor R17, R18, and the transistor M4 keep turning on.

After the computing system is turned on at time T2, the computing system enters the system states S0 and S3 respectively at time T3 and T4. At time T5, the computing system is turned off, and the system state is for example S5. The signals SLP_LAN_N and SLP_S5 are the high level and the low level respectively, and thus the determination circuit 61 outputs a high level voltage, and the transistor M4 is still turned on. Thus, the nodes N8 and N11 are still shorted, and the standby module of the power supply keeps enabled when the signal SLP_S4 or SLP_S5 changes from high level to low level.

Figure 7B:
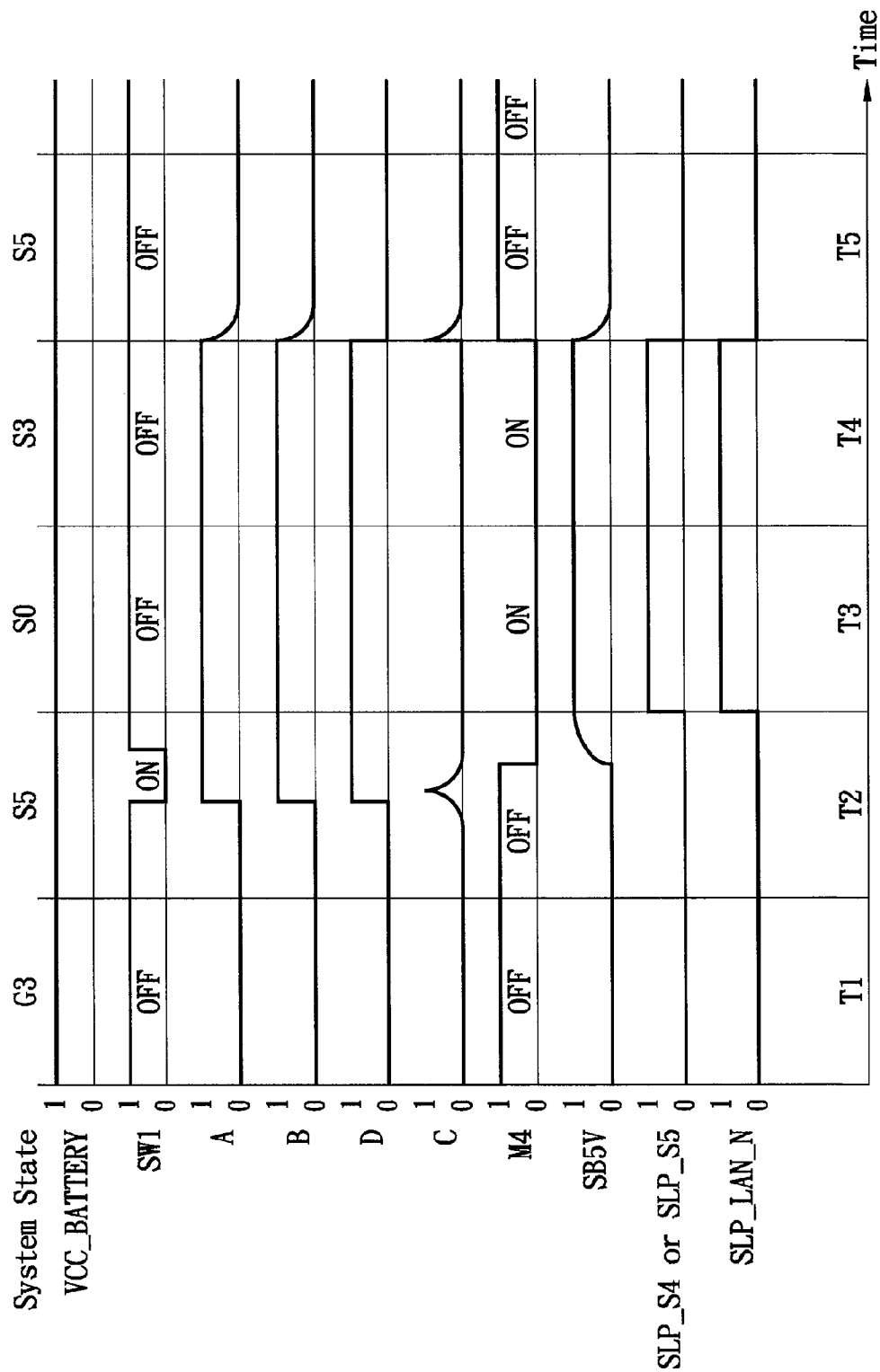
FIG. 7B is a wave diagram of the signals in the control circuitry when computing system does not supports the wake-up function according to an exemplary embodiment of the present disclosure.

Referring to FIG. 7B, FIG. 7B is a wave diagram of the signals in the control circuitry when computing system does not supports the wake-up function according to an exemplary embodiment of the present disclosure. At time T1, the computing system is turned off (i.e. the system state is for example G3). Then, at time T2, the user pushes the power switch SW1 to turn on the computing system (i.e. the system state is for example the S5 state), the pins P1 and P2 are shorted, and the pins P3 and P4 are shorted. A current is flowing from the battery VCC_BATTERY to the ground through the diode D8, the pins P3, P4, the diode D11, and the resistor R17, R18, and the transistor M4 is turned on. Since the transistor M4 is turned on, the pins P5 and P6 are shored, and pins P7 and P8 are shorted, a current is flowing from the standby voltage SB5V to the ground through the diode D10, the resistor R19, and the transistor M4. Thus, the standby module is enabled to provide the standby voltage SB5V to the mother board, and the diode D9 of the flow controller 3351 is then turned on, the diode D8 of the flow controller 3351 is turned off. Thus, a current is flowing from the standby voltage SB5V to the ground through the diode D9, the pins P3, P4, the diode D11 and the resistor R17, R18, and the transistor M4 is keep turning on.

After the computing system is turned on at time T2, the computing system enters the system states S0 and S3 respectively at time T3 and T4. From time T4 to time T5, both of the signals SLP_LAN_N and SLP_S5 change from high level to low level. At time T5, the signals SLP_LAN_N and SLP_S5 are the low level, thus the determination circuit 61 outputs a low level voltage, and the transistor M4 is turned off. Accordingly, the nodes N8 and N11 are disconnected, and the standby module of the power supply is disabled.

To sum up, exemplary embodiments of the present disclosure provide a power saving method and the control circuitry used in the computing system which can automatically turn off the standby module when the turned off computing system does not require the standby voltage (SB5V). The control circuitry disclosed in the exemplary embodiment of the present disclosure therefore meets the environmental protection tends, and brings the convenience to the user to save unnecessary power consumption without pulling the plug of the power supply or switching the on/off bottom of the power supply to disable the standby module.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A control circuitry used in a computing system, for enabling or disabling a standby module of a power supply, electrically coupled to two nodes of the standby module, comprising:
    a determination circuit, for judging a setting that whether the computing system being turned off requires a standby voltage;
    a transistor, a control end thereof is electrically coupled to the determination circuit, wherein when the determination circuit judges the setting that the computing system being turned off requires the standby voltage correspondingly, the determination circuit turns on the transistor, otherwise, the determination circuit turns off the transistor; and
    an optical coupler, electrically coupled to the transistor, wherein when the transistor is turned on, the optical coupler shorts the two nodes of the standby module to enable the standby module, and when the transistor is turned off, the optical coupler disconnects the two nodes of the standby module to disable the standby module.

2. The control circuitry according to claim 1, wherein the determination circuit receives a wake-up function supportable signal to judge the setting, wherein the wake-up function supportable is presented of whether the computing system supports a wake-up function.

3. The control circuitry according to claim 2, wherein the determination circuit further receives a system state signal, wherein the system state signal is presented of a system state of the computing system.

4. The control circuitry according to claim 3, wherein the determination circuit is a logic-OR operation gate.

5. The control circuitry according to claim 3, wherein the wake-up function supportable signal is a signal SLP_LAN_N, and the system state signal is a signal SLP_S5.

6. The control circuitry according to claim 1, further comprising:
a flow controller, coupled to a battery and the standby voltage, for selecting a current flowing from the battery or the standby voltage;
a first diode, coupled to the standby voltage, the flow controller, a power switch, and a first resistor;
the power switch, two pins thereof are coupled to two power ends of an AC power supply source respectively, another two pins thereof are coupled to the flow controller and a second diode respectively, wherein when the power switch is on, the two pins which coupled to two power ends are shorted, and the other two pins are shorted;
the second diode, coupled to a second resistor;
the second resistor coupled to the transistor, the determination circuit and a third resistor; and
the third resistor, coupled to the transistor and the ground.

7. The control circuitry according to claim 6, wherein when the turned off computing system is turned on, the current is flowing from the battery to the ground through the flow controller, the other two pins of the power switch, the second diode, the second resistor, and the third resistor, thus the transistor is turned on, and the current is flowing from the standby voltage to the ground through the flow controller, the other two pins of the power switch, the second diode, the second resistor, and the third resistor, thus the transistor keeps turning on, and the standby module is enabled.

8. The control circuitry according to claim 6, wherein the control circuitry is integrated in a mother board or a power supply.

9. A power supply, comprising:
an AC rectification block;
a system module, coupled to the AC rectification block; and
a standby module, coupled to the AC rectification block, having a control circuitry which electrically couples to the two nodes of the standby module for enabling or disabling the standby module, the control circuitry comprising:
a determination circuit, for judging a setting that whether a turned off computing system requires the standby voltage;
a transistor, a control end thereof electrically coupled to the determination circuit, wherein when the determination circuit judges the setting that the turned off computing system requires a standby voltage correspondingly, the determination circuit turns on the transistor, otherwise, the determination circuit turns off the transistor; and
an optical coupler, electrically coupled to the transistor, wherein when the transistor is turned on, the optical coupler shorts the two nodes of the standby module to enable the standby module, and when the transistor is turned off, the optical coupler disconnects the two nodes of the standby module to disable the standby module.

10. The power supply according to claim 9, wherein the determination circuit receives a wake-up function supportable signal to judge the setting, wherein the wake-up function supportable is presented of whether the computing system supports a wake-up function.

11. The power supply according to claim 10, wherein the determination circuit further receives a system state signal, wherein the system state signal is presented of a system state of the computing system.

12. The power supply according to claim 11, wherein the determination circuit is a logic-OR operation gate.

13. The power supply according to claim 11, wherein the wake-up function supportable is a signal SLP_LAN_N, and the system state signal is a signal SLP_S5.

14. The power supply according to claim 9, further comprising:
a flow controller, coupled to a battery and the standby voltage, for selecting a current flowing from the battery or the standby voltage;
a first diode, coupled to the standby voltage, the flow controller, a power switch, and a first resistor;
the power switch, two pins thereof are coupled to two power ends respectively, another two pins thereof are coupled to the flow controller and a second diode respectively, wherein when the power switch is on, the two pins which coupled to two power ends are shorted, and the other two pins are shorted;
the second diode, coupled to a second resistor;
the second resistor coupled to the transistor, the determination circuit and a third resistor; and
the third resistor, coupled to the transistor and the ground.

15. The power supply according to claim 14, wherein when the turned off computing system is turned on, the current is flowing from the battery to the ground through the flow controller, the other two pins of the power switch, the second diode, the second resistor, and the third resistor, thus the transistor is turned on; then, the current is flowing from the standby voltage to the ground through the flow controller, the other two pins of the power switch, the second diode, the second resistor, and the third resistor, thus the transistor keeps turning on, and the standby module is enabled.

* * * * *